United States Patent
Taguchi et al.

(10) Patent No.: US 9,987,960 B2
(45) Date of Patent: Jun. 5, 2018

(54) VEHICLE SEAT

(71) Applicant: TACHI-S CO., LTD., Tokyo (JP)

(72) Inventors: Masayuki Taguchi, Tokyo (JP); Naoyuki Makita, Tokyo (JP); Ukyo Miyazawa, Tokyo (JP); Daisuke Fujita, Tokyo (JP); Atsushi Ishii, Tokyo (JP); Kotaro Kumagai, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days. days.

(21) Appl. No.: 15/108,473

(22) PCT Filed: Dec. 24, 2014

(86) PCT No.: PCT/JP2014/084170
§ 371 (c)(1),
(2) Date: Jun. 27, 2016

(87) PCT Pub. No.: WO2015/105000
PCT Pub. Date: Jul. 16, 2015

(65) Prior Publication Data
US 2016/0325659 A1    Nov. 10, 2016

(30) Foreign Application Priority Data

Jan. 7, 2014  (JP) ................. 2014-000806

(51) Int. Cl.
*B60N 2/58*     (2006.01)
*B60N 2/60*     (2006.01)
(Continued)

(52) U.S. Cl.
CPC .............. *B60N 2/5883* (2013.01); *B60N 2/06* (2013.01); *B60N 2/0715* (2013.01);
(Continued)

(58) Field of Classification Search
CPC ...... B60N 2/5883; B60N 2/06; B60N 2/0715; B60N 2/0732; B60N 2/5816; B60N 2/5825; B60N 2/6009; B60N 2/686
See application file for complete search history.

(56) References Cited

U.S. PATENT DOCUMENTS 3,981,534 A * 9/1976 Wilton .................. A47C 7/185
                                                  297/218.1
4,767,155 A   8/1988 Kousaka et al.
(Continued)

FOREIGN PATENT DOCUMENTS

DE      102006034591 A1    2/2007
FR           2889128    *   2/2007
(Continued)

*Primary Examiner* — Philip F Gabler
(74) *Attorney, Agent, or Firm* — Birch, Stewart, Kolasch & Birch, LLP

(57) ABSTRACT

[Purpose] To provide a vehicle seat having a garnish attached thereto, which is simplified in structure for easy secure attachment of the garnish to a seat cushion of the seat, and also highly improved as to outer appearance quality of the seat cushion.
[Means for Achieving the Purpose] A vehicle seat of the present invention includes: a frame 4 formed from a sheet metal, the frame standing upright in a vertical direction thereof; a garnish 1 engaged with and fitted to the frame 4 so as to cover an outer peripheral surface of that frame; a cushion element 3 supported by the frame 4; and a trim cover element 2 covering the cushion element 3. In this vehicle seat, a terminal end portion 20 of the trim cover element 2 is fixedly secured to an outer surface of the garnish 1.

8 Claims, 6 Drawing Sheets

(51) Int. Cl.
 *B60N 2/07* (2006.01)
 *B60N 2/06* (2006.01)
 *B60N 2/68* (2006.01)

(52) U.S. Cl.
 CPC ......... *B60N 2/0732* (2013.01); *B60N 2/5816* (2013.01); *B60N 2/5825* (2013.01); *B60N 2/6009* (2013.01); *B60N 2/686* (2013.01)

(56) References Cited

U.S. PATENT DOCUMENTS

| | | | | |
|---|---|---|---|---|
| 5,560,677 | A * | 10/1996 | Cykana | B60N 2/5825 297/218.3 |
| 5,820,213 | A * | 10/1998 | Severinski | A47C 31/023 24/336 |
| 5,826,939 | A * | 10/1998 | Beyer | B60N 2/5825 24/369 |
| 5,879,051 | A * | 3/1999 | Cozzani | A47C 31/023 297/218.1 |
| 6,745,444 | B2 * | 6/2004 | Moilanen | B60N 2/5825 29/91.1 |
| 7,891,735 | B2 * | 2/2011 | Oku | B60N 2/5825 297/218.3 |
| 9,067,519 | B2 * | 6/2015 | Kajihara | B60N 2/5825 |
| 2011/0169317 | A1 * | 7/2011 | Fujita | A47C 7/02 297/452.2 |
| 2012/0313408 | A1 | 12/2012 | Nagata et al. | |

FOREIGN PATENT DOCUMENTS

| | | |
|---|---|---|
| JP | 6-13695 U | 2/1994 |
| JP | 2001-55070 A | 2/2001 |
| JP | 2009-12548 A | 1/2009 |
| JP | 2010-215192 A | 9/2010 |

\* cited by examiner

[FIG. 1]
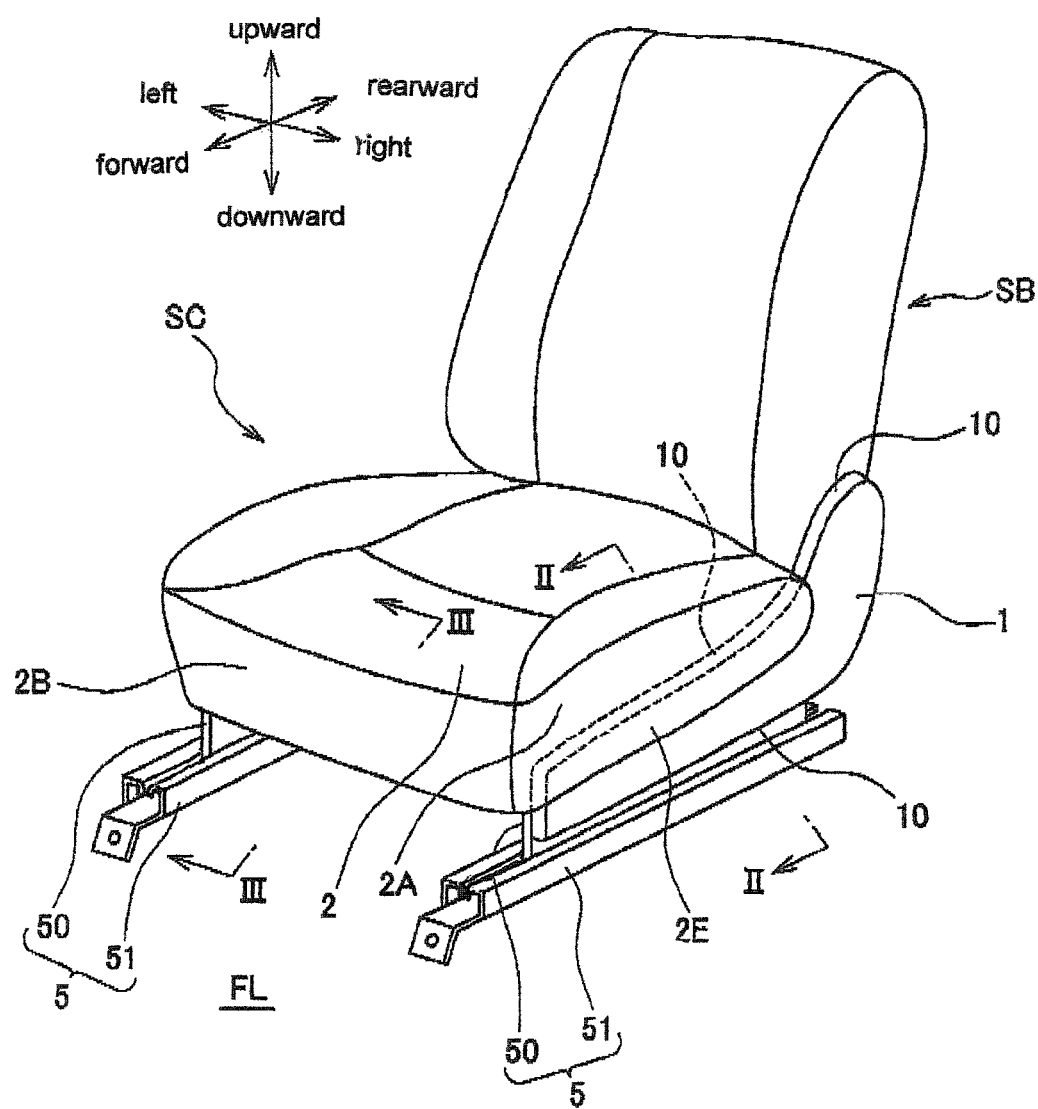

[FIG. 2]
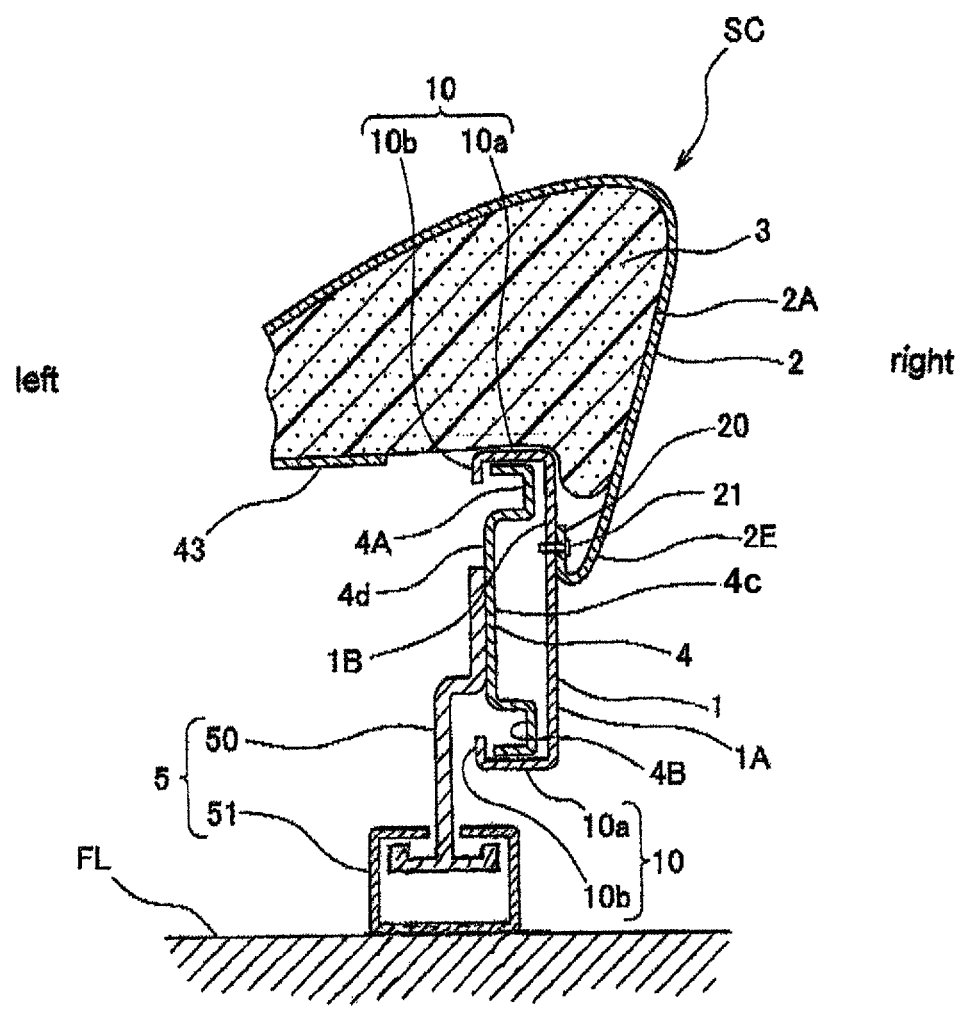

[FIG. 3]
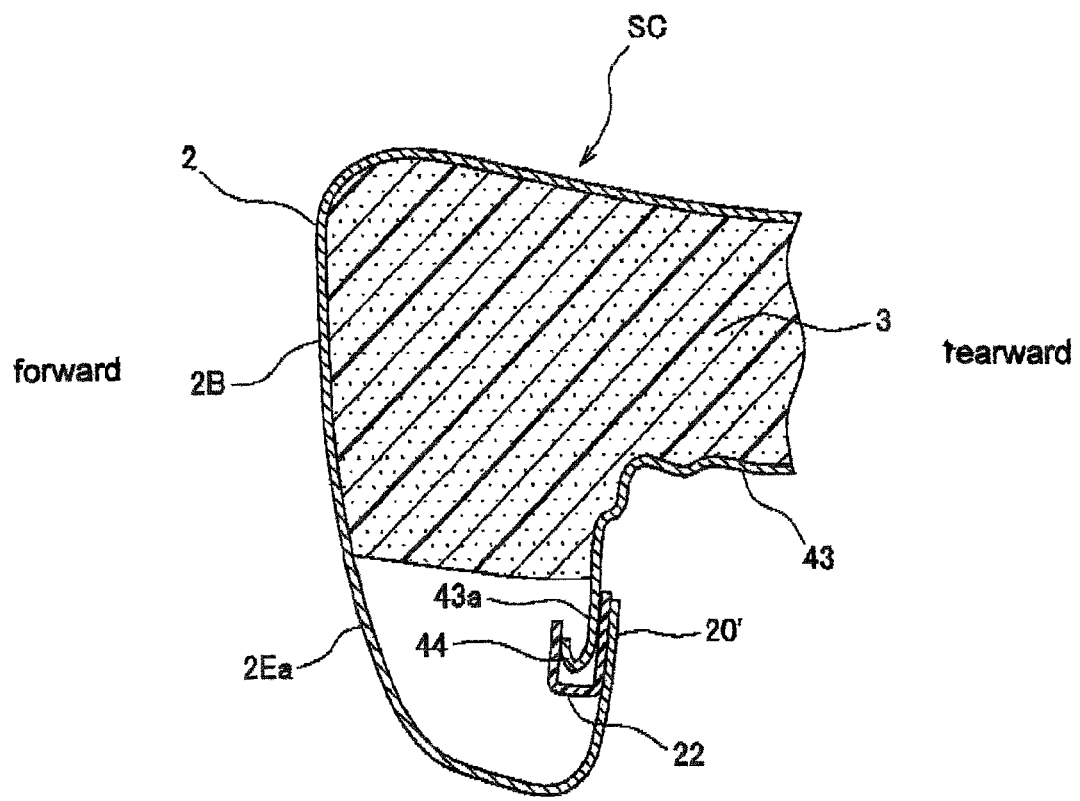

[FIG. 4]
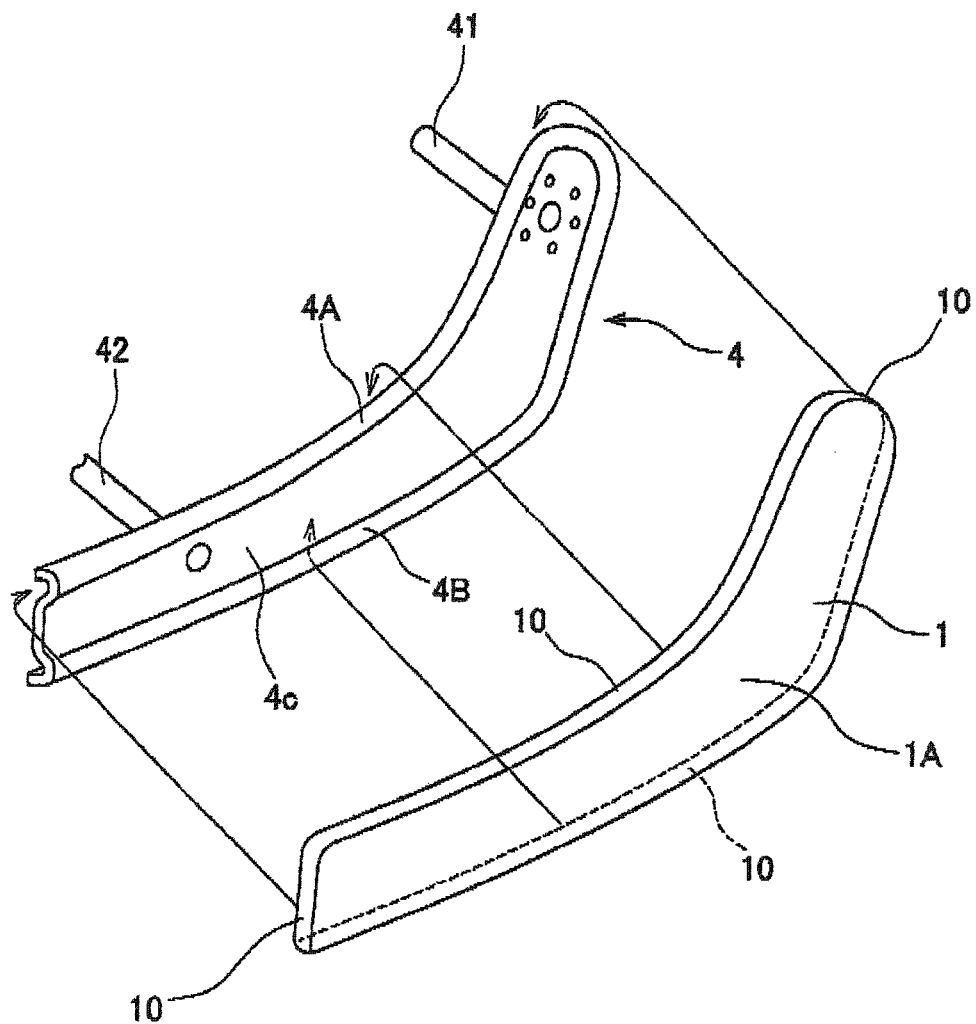

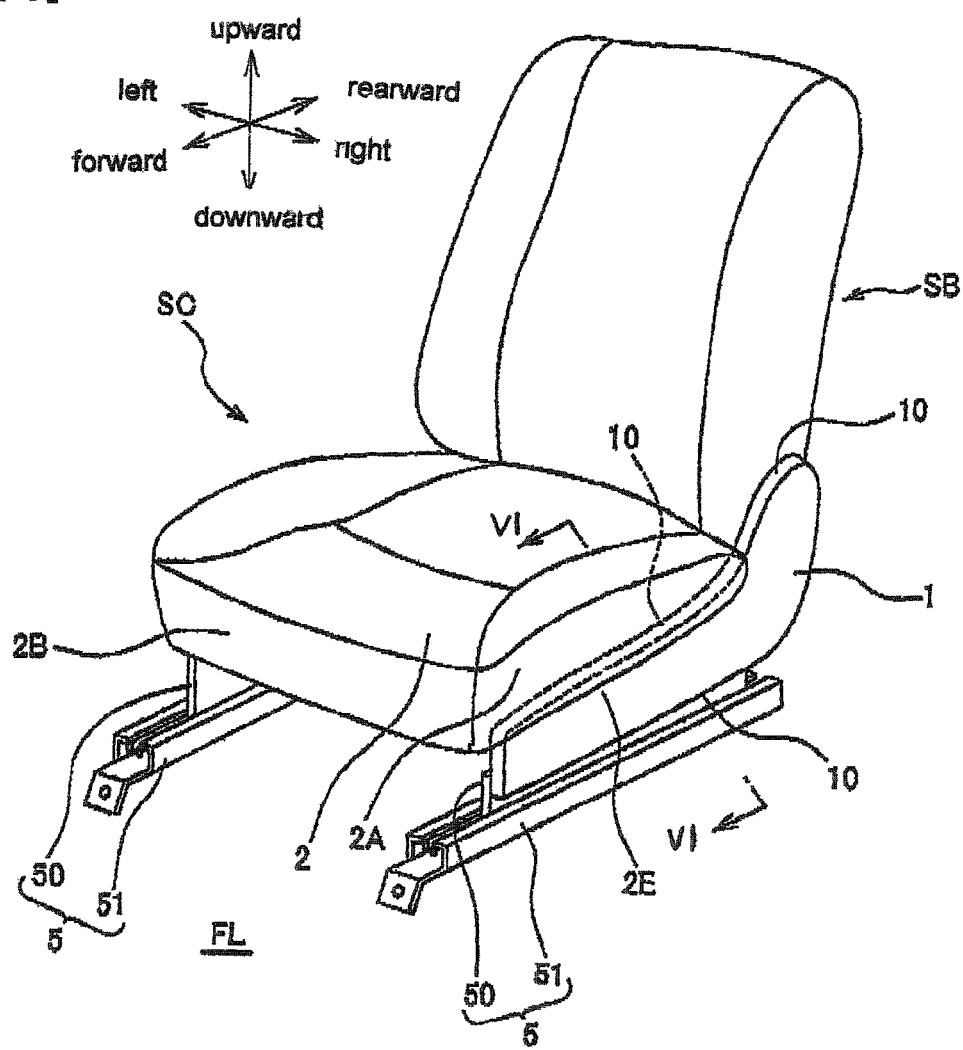
[FIG. 5]

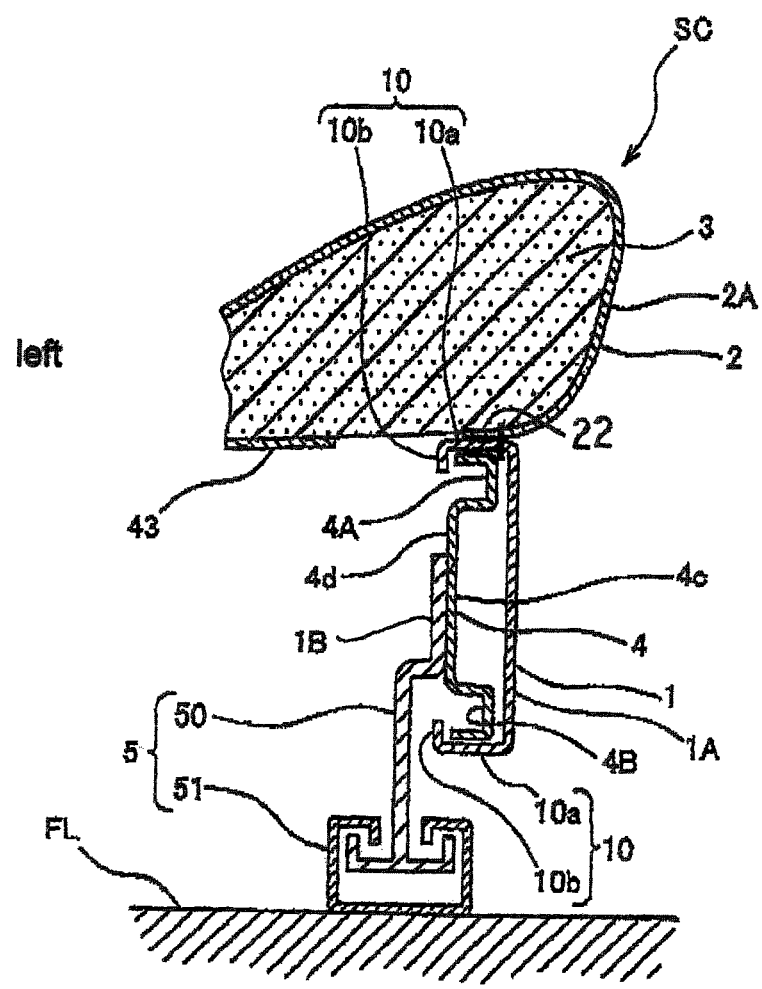
[FIG. 6]

VEHICLE SEAT

TECHNICAL FIELD

The present invention relates to a vehicle seat. In particular, the invention is directed to a vehicle seat of the type wherein a garnish is provided to an outer lateral surface of a seat cushion of the seat.

BACKGROUND ART

For example, a Japanese Laid-Open Patent Publication No. 2009-12548 teaches a vehicle seat, or strictly stated, an automotive seat included in the vehicle seat, the automotive seat having a seat cushion which is provided with a pair of garnishes at two lateral sides of the seat cushion, respectively. According to this seat, a pair of metallic frames, each being made of a sheet metal, extend adjacently along the two lateral sides of the seat cushion, respectively, and such pair of metallic frames are respectively covered and concealed by a pair of garnishes each made of a synthetic resin material. Thus, the garnishes are effective for not only avoiding exposure of the metallic frames as well as of any mechanical elements secured to the metallic frames, thereby protecting a seat occupant against injury and physical damages that may occur to him or her from those hard frame and mechanical elements, but also improving an outer aesthetic appearance of the seat cushion.

In this sort of conventional seat cushion, in assembly, each of the metallic frames must be formed with securing holes for allowing a corresponding one of the two garnishes to be securely mounted thereat, whereas on the other hand, each of the garnishes must be provided with securing parts, such as clips, which are adapted for secure engagement with the securing holes.

Therefore, the conventional seat cushion having the garnishes is naturally provided with the aforesaid garnish securing elements, and in practical assembly of the seat cushion, at first, a cushion element forming a part of the seat cushion, such as a foam padding, is covered with a trim cover element, followed by anchoring end portions of the trim cover element to predetermined frames or locations in the seat cushion, and subsequent to those steps, the two garnishes of synthetic resin material are respectively attached via the securing elements over the two lateral regions of the seat cushion where the aforesaid metallic frames and mechanical elements secured thereto are exposed outwardly, so that in a resulting seat cushion, all those exposed elements are covered invisibly with the garnishes

PRIOR-ART LITERATURE

Patent-Related Document

Patent-related Document 1: Japanese Laid-Open Patent Publication No. 2009-12548

SUMMARY OF THE INVENTION

Problems to be Solved by the Present Invention

As described above, the conventional seat cushion with garnishes is therefore constructed such that the trim cover element is at its end portions anchoringly secured to a pertinent frame, while on the other hand, the garnishes are securely attached to an additional frame other than the first frame to which the trim cover element is anchored. This prior-art arrangement is obviously defective in requiring troublesome, time-consuming steps for securing the trim cover element and garnishes to the seat cushion. Further, in this prior art, it is required that anchor elements for anchoring the end portions of the trim cover element to the aforesaid first frame should be provided and disposed on that particular first frame, and also, with regard to the garnishes, securing elements for securing the garnishes to the aforesaid second frame be provided and disposed on that second frame, as a result of which, a construction of the seat cushion is extremely complicated.

It is a purpose of the present invention to provide a vehicle seat having a garnish attached thereto, which is simplified in structure for easy secure attachment of the garnish to a seat cushion of the seat, and also highly improved as to outer appearance quality of the seat cushion.

Means for Solving the Problem

In order to achieve the above-stated purpose, according to the present invention, there is provided a vehicle seat which includes: a frame formed from a sheet metal; a garnish which is attached to said frame by being engaged with and fitted to a peripheral end of the frame so as to cover at least an outer lateral surface of the frame, wherein the outer lateral surface of the frame faces a lateral side of the vehicle seat; a cushion element; and a trim cover element covering the cushion element, the vehicle seat being characterized in that an end portion of the trim cover element is fixedly connected with the garnish.

Accordingly, this arrangement means that the end portion of the trim cover assembly has been firmly secured to the garnish in an integral manner in advance before attaching the garnish to the frame, and as such, there is no other required step than to merely engage and fit the garnish to the frame at upholstering stage in forming the seat cushion. Thus, by simply engaging and fitting the garnish to the frame, the trim cover element and garnish can be attached on the cushion element and the frame, respectively, at one time, which greatly improves the assembly of seat cushion in terms of efficiency and rapidity. Further, there is no need to provide any securing element for securing the garnish and the end portion of the trim cover element to the frame, so that it is possible to avoid complicated securing arrangement in the end portion of the trim cover element as well as in the garnish.

Preferably, the garnish may be formed from a soft resin material amenable to sewing. In that instance, the end portion of the trim cover element and the garnish may be connected with each other by sewing, either in such a fashion that the end portion of the trim cover element is positioned on an outer surface of the garnish facing the lateral side of the vehicle seat, or in such a fashion that the end portion of the trim cover element is positioned on an upper side of a peripheral end portion of the garnish. The garnish itself may be resiliently deformable into any desired shape, and therefore can easily be formed in a shape not strictly but substantially conforming to a contour of the frame, thus enabling a worker to easily ensure that the garnish neatly covers and fits the frame in conformity with the contour thereof, when he or she simply attaches the garnish to the frame. Therefore, at the step of attaching the garnish to the frame, there is no particular necessity for the worker to adjustingly set the garnish against the frame.

According to the foregoing embodiment where the end portion of the trim cover element and the garnish is connected with each other by sewing, such that the end portion of the trim cover element is positioned either on the outer surface of the garnish or on the upper end side of the peripheral end portion of the garnish, it is possible to easily, precisely secure the end portion of the trim cover element to the garnish. Further, the end portion of the trim cover element is connected to the upper end of the garnish so as to extend thereover. This arrangement not only prevents outward exposure of the upper end side of the garnish, but also precludes any external factor for causing outward separation and warping of the end portion of the trim cover element away from the upper end side of the garnish. Therefore, separation of the trim cover element's end from the garnish is positively prevented, so that no tear or cut will occur there, thus avoiding possibility for the garnish's upper end side to be exposed from the trim cover element's end side attached thereto. For that reason, the outer aesthetic appearance of lateral side of the seat cushion can be maintained in its own quality condition. Moreover, even when an external load is applied toward the garnish, most of the load is first absorbed in the end portion of the trim cover element and turned to a small load yielding quite a low impact that may not influence the garnish, whereby breakage or damage of the garnish can be prevented against an externally applied load, hence making it possible to attain a quality improvement in the outer appearance of the seat cushion.

The garnish may also be formed from an elastomer or unwoven fabric material, in which case, it is possible to easily form the garnish in a desired shape and also provide the garnish with a proper elasticity that allows its resilient direct engagement and fitting to the frame.

Further, the garnish may be so formed to include: an outer surface facing the lateral side of the vehicle seat, the outer surface having a predetermined shape as viewed in plan, such a predetermined shape being substantially equal to a shape of the frame which is viewed in plan; and an engagement portion extending in a direction inwardly of the garnish, the engagement portion being formed by bending a peripheral end portion of the garnish in the direction inwardly of the garnish. Such engagement portion of the garnish is engaged over and fitted to said peripheral end of said frame. This arrangement facilitates the ease with which the engagement portion of the garnish is engaged over and fitted to the peripheral end of the frame.

Effects of the Invention

According to the present invention, the garnish not only serves as a covering element for covering the frame, but also severs as a connecting element for securely connecting the end portion of the trim cover element to the frame. Hence, securing both garnish and trim cover element to the frame is quite simplified in structure and process, thereby providing an improvement in terms of high efficient mounting of both garnish and trim cover element to the seat cushion.

Also, in the present invention, the trim cover element and garnish are connected with each other in an integral fashion, which gives an aesthetically improved outer appearance to the seat cushion.

BRIEF DESCRIPTION OF THE DRAWINGS

FIG. 1: A perspective view showing one exemplary embodiment of a seat cushion of an automotive seat in accordance with the present invention.

FIG. 2: A sectional view taken along the line II-II in the FIG. 1.

FIG. 3: A sectional view taken along the line III-III in the FIG. 1.

FIG. 4: A perspective view illustrating a part of frame and a garnish which are principal constituent elements in the present invention.

FIG. 5: A perspective view of an automotive seat having another embodiment of seat cushion in accordance with the present invention.

FIG. 6: A sectional view taken along the line VI-VI in the FIG. 5.

MODE FOR CARRYING OUT THE INVENTION

With reference to FIGS. 1 to 4, a description will be made of one exemplary embodiment of the present invention.

The illustrated seat is an automotive seat encompassed by the present invention as one exemplary mode of vehicle seats, and in particular, the seat is a front seat for use in an automobile. In FIG. 1, designation SC denotes a seat cushion of that seat, and designation SB denotes a seat back thereof.

A garnish 1 is shown as being attached on and along substantially an entire lateral surface region of the seat cushion SC and a localized lower lateral surface region of the seat back SB, wherein it is noted that, in a similar fashion thereto, a pair of such garnishes 1 may be respectively attached to left and right lateral sides of the seat cushion as well as to left and right lateral sides of the seat back. Further, firmly sewn with the garnish 1 is a terminal end portion 20 of a trim cover element 2, and in this respect, such terminal end portion 20 is sewn by a sewing machine to and along an outer surface of the garnish 1.

In FIG. 1, designation 2A denotes one lateral skirt portion of the trim cover element 2 which covers a corresponding lateral surface portion of the seat cushion, and designation 2B denotes a front skirt portion of the trim cover element 2 which covers a corresponding front surface portion of the seat cushion. Designation 5 denotes a slide rail adapted for permitting the seat cushion SC to be adjustably moved in forward and rearward directions, such slide rail comprising: a movable rail member 50 provided to the seat cushion; and a stationary rail member 51 fixed on a floor of automobile FL, wherein the movable rail member 50 is slidably engaged with the stationary rail member 51.

The seat cushion SC is basically comprised of: a cushion element 3, such as a foam padding; the aforesaid trim cover element 2 covering the cushion element 3; and a frame 4 by which the cushion element 3 is supported. The frame 4, made of a sheet metal, is shown as standing upright in a vertical direction thereof and also extending in a longitudinal direction thereof below and along one lateral side of the seat cushion, wherein it is noted that, in a similar fashion thereto, a pair of such frames 4 may be provided to the left and right lateral sides of the seat cushion, respectively. As shown in FIG. 4, integrally connected fast to the frame 4 are a front tubular member 41 and a rear tubular member 42. Though not shown, those two tubular members 41 and 42 are fixedly connected with a support plate 43.

An upper end portion of the movable rail member 50 is fixed by welding to an inward surface 4d of the aforesaid frame 4. As shown, the frame 4 itself has a reinforcing flange 4A formed integrally in an upper end thereof, and also has a reinforcing flange 4B formed integrally in a lower end thereof.

The garnish 1 is formed to define the following portions integral therewith: an outer surface portion 1A facing a lateral side of the seat cushion, such outer surface portion 1A being substantially identical in shape to an outer lateral surface portion 4c of the frame 4 which also faces the lateral side of the seat cushion; and a fittingly engageable portion 10 formed by bending an entire peripheral end portion of the outer surface portion 1A in a direction inwardly of the garnish. The outer surface portion 1A and fittingly engageable portion 10 are also formed integral with each other, as shown.

Specifically, the fittingly engageable portion 10 of the garnish 1 is provided with: a peripheral wall region 10a formed by bending a predetermined entire peripheral area of the outer surface portion 1A by a right angle towards an inward side of the garnish which is to face the inward side of the seat cushion; and an engagement region 10b formed by bending a predetermined terminal region of the peripheral wall portion 10a by a right angle so as to extend inwardly of the garnish in parallel with the outer surface portion of the garnish. (See FIG. 2)

FIG. 4 indicates how the garnish 1 is attached to the frame 4 and it can be seen therefrom that both peripheral wall region 10a and engagement region 10b of the garnish 1 are to be resiliently engaged over and fitted to the flanges 4A and 4B of the frame 4 in an embracing way, wherein the flanges 4A and 4B form an outer peripheral end of the frame 4.

The garnish 1 is formed from a soft synthetic resin material amenable to sewing by a sewing machine, which may include an elastomer for example. A recommended elastomer for the garnish is an olefin elastomer, but instead thereof, a thermoplastic elastomer or any other synthetic resin material having a rubber property may be used as a material for forming the garnish.

Such an elastomer characteristics permits the garnish 1 itself to be resiliently deformable into any desired shape, for which reason, the garnish 1 can easily be formed in a shape not strictly but substantially conforming to a contour of the frame 4, thus making it easy for a worker to ensure that the garnish 1 neatly covers and fits the entire pertinent region of the frame 4 in conformity with the contour thereof, when he or she simply attaches the garnish to the frame. Accordingly, at the step of attaching the garnish 1 to the frame 4, the worker is not particularly required to adjustingly set the garnish 1 against the frame 4, but can manage to directly attach the garnish to that frame with much ease.

Further, the terminal end portion 20 of the trim cover element 2 can be readily sewn to and along the garnish 1 in advance before attaching the garnish 1 to the frame 4. Hence, as shown, the trim cover element's terminal end portion 20 is simply sewn and along the garnish 1, which means that no special connecting element is required for connecting the garnish 1 and the frame 4, so that it is possible to reduce number of constituent elements and eliminate inefficient assembly steps.

In this regard, optionally, the garnish 1 may be formed from an unwoven fabric material which is of course amenable to sewing, but has a certain robust property with a resilient recovery of its original shape to preclude unrecoverable deformation thereof. For example, Japanese Laid-Open Utility Model Publication No. H 7-15448 teaches a suitable unwoven fabric material of this sort, which is formed by a process wherein a base fabric material of polyester fibers impregnated with a liquid SB resin material is heated and treated under the steps indicated, and finally shaped by press working into a resulting unwoven fabric material which may be suited for use as the garnish 1 in the present invention.

As seen in FIG. 2, the terminal end portion 20 of the lateral skirt portion 2A of the trim cover element 2 is sewn to and along an upper portion 1B of the garnish 1, such sewing being effected by a sewing machine although the sewing machine is not shown. Here, a folded portion 2E is shown to be defined in and along a lower end of the lateral skirt portion 2A. Formation of this folded portion 2E is such that the aforesaid terminal end portion 20 is folded over upwardly from a preset line that defines a lower distal end of the lateral skirt portion 2A so as to extend from that preset line upwardly along the inward side of the lateral skirt portion. This provision of the folded portion 2E is advantageous in locating a seam or stitched portion 21 inside of the lateral skirt portion 2A, hence making the stitched portion 21 invisible from the outside and avoiding its outward exposure.

As appreciated from the description above, the terminal end portion 20 of the trim cover element is directly sewn with the garnish 1 which is an element to be securely attached to the side of the seat cushion. This eliminates the previously-stated conventional steps that require insertion of a connecting wire in a tubular portion of a trim cover assembly for connection of the trim cover element to a garnish. Hence, in the present invention, securing of the ends of the trim cover element to the garnish is quite simplified in structure and process, which enables a worker to easily fix the terminal end portion 20 of the trim cover element 2 to the garnish, so that a high-efficient, rapid assembly of the seat cushion can be realized.

Further, the folded portion 2E of the trim cover element 2 is firmly attached to the upper end portion 1B of the garnish 1 in such a fashion as to extend thereover. This arrangement precludes external factors for causing outward separation and warping of the lower distal end of the trim cover element 2 away from the upper side of the garnish 1. Therefore, separation of the trim cover element's end from the garnish is positively prevented, so that no tear or cut will occur there, thus avoiding possibility for the garnish's upper end portion 1B to be exposed from the trim cover element's end side attached thereto. For that reason, the outer aesthetic appearance of lateral side of the seat cushion SC (the right lateral side of the seat cushion as viewed from the Figures, for instance) can be maintained in its own quality condition. Moreover, even when an external load is applied toward the garnish 1, most of the load is first absorbed in the folded portion 2E and turned to a small load yielding quite a low impact that may not influence the garnish 1, whereby breakage or damage of the garnish 1 can be prevented against an externally applied load.

It is noted that securing the end portion 20 of the trim cover element 2 to the garnish is not limited to the above-described firm connection by sewing, but other suitable securing element, such as an adhesive or snap fasteners, may be used.

As shown in FIG. 3, an anchor element 22 having a substantially "U" shaped cross-section, which is made of a synthetic resin material, is fixedly sewn to and along a terminal end portion 20' of the front skirt portion 2B of the trim cover element 2. This anchor element 22 is anchoringly engaged over and with an engagement piece 44 defined integrally in a front end portion 43a of a padding support plate 43, and as such, the terminal end region 20' of the froth skirt portion 2B is fixedly connected to and along the front end portion 43a of the padding support plate 43. Here, it is observed that the front skirt portion 2B has a folded portion 2Ea defined along the lower end thereof, and that a lower distal end of that folded portion 2Ea is substantially aligned with a lower distal end of the previously-stated folded portion 2E of the lateral skirt portion 2A. With this arrangement, the front surface (2B) and lateral surface (2A) of the seat cushion SB are substantially equal to each other in vertical width, whereupon uniform lateral wall surfaces are neatly defined in the seat cushion SB, thereby aesthetically improving an outer appearance of the seat cushion.

In this context, it is understood that the trim cover element 5 also has a rear skirt portion (not shown) on a rear side thereof opposite to the front skirt portion 2B, and that a terminal end of that rear skirt portion is securely anchored to a rear end (not shown) of the padding support plate 43 by means of securing elements substantially identical to the aforesaid anchor element 22 and engagement piece 44.

Accordingly, the seat cushion SC is formed by the steps of: covering the cushion element 3 with the trim cover element 2 to which the garnish 1 has been firmly sewn as described above; and thereafter engaging and fitting the two fittingly engageable portions 10 and 10 of the garnish 1 over and to the two flanges 4A and 4B of the frame 4, respectively. In that manner, not only the garnish 1 is fixedly secured to the frame 4, but also the terminal end portion 20 of the trim cover element 2 is fixedly anchored to the frame 4, whereupon the seat cushion SC is formed in the configuration shown in FIG. 1.

In the present invention, therefore, the outer surfaces of the frame 4 are entirely covered with the garnish 1, and further, the upper portion 1B of the garnish 1 is covered with both terminal end portion 20 and folded portion 2E of the trim cover element 2, This covering arrangement furnishes the seat cushion SB with a valuable design improvement, Additionally, the present invention does not require any securing hole or element by which the garnish is securely connected to the frame as with the prior art, but permits direct securing of the garnish per se to any conventional frame equivalent to the frame 4. Namely, most of conventional frames available in the art of seats may be directly used in the present invention, without any connecting element required for that purpose. Further, the garnish 1 does not require any securing element, such as securing screws required in the conventional garnish, for fixation of the garnish to the frame, and therefore, the garnish of the present invention can maintain its simple structure that does permit direct secure connection of the garnish to the frame.

FIGS. 5 and 6 illustrate another alternative embodiment of the present invention, which is basically identical to the preceding first embodiment, except for some partial elements different than the first embodiment. Therefore, a description will be made mainly of the different elements, on the understanding that all like designations to be used hereinafter correspond to all like designations used in the first embodiment.

According to this second embodiment, the trim cover element 2 is formed with a terminal end portion 22, and as shown, that terminal end portion 22 is sewn to and along an upper side region of the peripheral wall portion 10b of the garnish 1. The said upper side region of the peripheral walls portion 10b, which is an integral part of the fittingly engageable portion 10, is formed by bending a corresponding region of the fittingly engageable portion 10, as illustrated.

It is therefore to be appreciated that, in substantially the same manner as in the preceding first embodiment, the garnish 1 can be directly attached and secured to the entire outer surface of the frame 4, with the trim cover element overlaying the cushion element, and that an outer appearance resulted from the garnish and trim cover element thus attached to the seat cushion indeed offers its own valuable effect of design. Further, similarly to the first embodiment, this second embodiment requires no securing hole or element by which the garnish is securely connected to the frame as with the prior art, but permits direct securing of the garnish to any conventional frame equivalent to the frame 4. Namely, most of conventional frames available in the art of seats may be directly used in the present invention, without any connecting element required for that purpose. Furthermore, similarly to the first embodiment, the garnish 1 does not require any securing element for fixation of the garnish to the frame, such as securing screws required in the conventional garnishes, and therefore, in the second embodiment as well, the garnish per se can maintain its simple structure that does permit direct secure connection of the garnish to the frame.

DESCRIPTION OF THE REFERENCE NUMERALS

1: garnish
2: trim cover element
3: cushion element
4: frame
2A: lateral skirt portion of the trim cover element
2B: front skirt portion of the trim cover element
20: end portion of the lateral skirt portion
20': end portion of the front skirt portion
2E: folded portion of the lateral skirt portion
2Ea: folded portion of the front skirt portion

The invention claimed is:

1. A vehicle seat comprising:
a frame formed from a sheet metal, said frame having:
   an inner lateral surface facing an inward side of the frame;
   an outer lateral surface opposite to said inner lateral surface, said outer lateral surface facing an outward side of the frame, said outward side facing a lateral side of the vehicle seat;
   said outer lateral surface having a predetermined shape as viewed in plan; and
   a peripheral end defined integral with and peripheral of the frame, said peripheral end facing said outward side of said frame;
a cushion element supported by said frame;
a trim cover element covering said cushion element, said trim cover element including an end portion;
a garnish configured to cover an entirety of said outer lateral surface of said frame and an entirety of said peripheral end of said frame, said garnish being formed of a soft resin material having a resilient deformability and a resilient recovery to an original shape thereof, said soft resin material being amenable to sewing;
said end of said trim cover element being sewn to said garnish;
said garnish including:
   a body having:
      an outer surface portion adapted to face said lateral side of said vehicle seat; and
      an inner surface portion opposite to said outer surface portion, said inner surface portion facing an inward side of said body and being adapted to overlie said outer lateral surface of said frame;
   said body having a predetermined shape as viewed in plan, said pre-determined shape being substantially equal to said predetermined shape of said outer lateral surface of said frame, whereupon said outer and inner surface portions of the body are substantially equal in shape to said outer lateral surface of said frame, thereby allowing both said outer and inner surface portions to be resiliently deformed and recovered into a shape for covering said entirety of said outer lateral surface of said frame;

an engagement portion for fitting engagement to and along said peripheral end of said frame, said engagement portion comprising an inwardly bent peripheral end portion bending in a direction to said inward side of said body; and said inwardly-bent peripheral end portion being defined integral with and along an entire peripheral end of said body and being shaped to allow the inwardly-bent peripheral end portion itself to be resiliently and fittingly engaged with and along said entirety of said peripheral end of said frame; and said garnish with said end portion of said trim cover element sewn thereto being at said inwardly-bent peripheral end portion thereof resiliently engaged over and fitted to and along said entirety of said peripheral end of said frame, so that said outer lateral surface of said frame and said peripheral end of said frame are entirely covered with and secured to said body of said garnish and said inwardly-bent peripheral end portion of said garnish, respectively, due to said resilient recovery of the garnish.

2. The vehicle seat according to claim 1, wherein said end portion of said trim cover element and said garnish are sewn with each other in such a fashion that the end portion of the trim cover element is positioned on said outer surface of the garnish.

3. The vehicle seat according to claim 1, wherein said end portion of said trim cover element and said garnish are sewn with each other in such a fashion that the end portion of the trim cover element is positioned on an upper side of a peripheral end portion of the garnish.

4. The vehicle seat according to claim 1, wherein said garnish is formed from an elastomer.

5. The vehicle seat according to claim 1, wherein said garnish is formed from an unwoven fabric material.

6. The vehicle seat according to claim 1, wherein said end portion of said trim cover element includes: a folded portion extending to an outer surface of said garnish which faces said lateral side of the vehicle seat; and an inward side facing said outer surface region of said garnish, wherein said folded portion is formed by folding over said end portion of the trim cover element, so that said end portion is located on said inward side of the trim cover element, and wherein said folded portion is at an end thereof sewn with said garnish so as to be located on said outer surface of the garnish.

7. The vehicle seat according to claim 1, wherein said end portion of said trim cover element includes a folded portion extending to an upper side of a peripheral end portion of said garnish; said folded portion being formed by bending said end portion of the trim cover element towards said upper side of said peripheral portion of said garnish in a direction inwardly of the garnish, and wherein said folded portion is at an end thereof sewn with said upper side of said peripheral end portion of the garnish so as to be located on said upper side.

8. The vehicle seat according to claim 1, wherein said peripheral end of said frame comprises: an inwardly-extending peripheral end extending in a direction form said outer lateral surface of the frame to said inner lateral surface thereof;

said inwardly-bent peripheral end portion of said garnish includes an engagement region for resiliently embracing engagement with an entirety of said inwardly-extending peripheral end of said frame; and said garnish with said end portion of said trim cover element sewn thereto is at said engagement region thereof resiliently engaged over and fitted to and along said entirety of said inwardly-bent peripheral end of said frame, in an embracing way.

* * * * *